(12) United States Patent
van Nee

(10) Patent No.: US 8,514,690 B2
(45) Date of Patent: Aug. 20, 2013

(54) M-ARY ORTHOGONAL KEYING SYSTEM

(75) Inventor: D. J. Richard van Nee, De Meern (NL)

(73) Assignee: LSI Corporation, Milpitas, CA (US)

( * ) Notice: Subject to any disclaimer, the term of this patent is extended or adjusted under 35 U.S.C. 154(b) by 89 days.

(21) Appl. No.: 13/080,018

(22) Filed: Apr. 5, 2011

(65) Prior Publication Data

US 2011/0182170 A1 Jul. 28, 2011

Related U.S. Application Data

(63) Continuation of application No. 12/508,785, filed on Jul. 24, 2009, now Pat. No. 7,957,256, which is a continuation of application No. 11/484,443, filed on Jul. 10, 2006, now Pat. No. 7,583,582, which is a continuation of application No. 10/153,412, filed on May 22, 2002, now Pat. No. 7,787,355, which is a continuation of application No. 09/057,310, filed on Apr. 8, 1998, now Pat. No. 6,404,732, which is a continuation-in-part of application No. 08/688,574, filed on Jul. 30, 1996, now Pat. No. 5,862,182.

(51) Int. Cl.
*H04J 11/00* (2006.01)

(52) U.S. Cl.
USPC .......................................... 370/206; 375/295

(58) Field of Classification Search
None
See application file for complete search history.

(56) References Cited

U.S. PATENT DOCUMENTS

| | | | |
|---|---|---|---|
| 4,176,316 A | 11/1979 | De Rosa et al. | |
| 4,353,067 A | 10/1982 | Mims | |
| 4,434,499 A | 2/1984 | Motsch et al. | |
| 4,494,228 A | 1/1985 | Gutleber | |
| 4,513,288 A | 4/1985 | Weathers et al. | |
| 4,514,853 A | 4/1985 | Gutleber | |
| 4,529,963 A | 7/1985 | Gutleber | |
| 4,707,839 A | 11/1987 | Andren et al. | |
| 4,901,307 A | 2/1990 | Gilhousen et al. | |
| 5,001,723 A * | 3/1991 | Kerr | 375/141 |
| 5,103,459 A | 4/1992 | Gilhousen et al. | |
| 5,109,390 A | 4/1992 | Gilhousen et al. | |
| 5,151,702 A | 9/1992 | Urkowitz | |
| 5,151,919 A | 9/1992 | Dent | |
| 5,187,675 A | 2/1993 | Dent et al. | |

(Continued)

FOREIGN PATENT DOCUMENTS

| | | |
|---|---|---|
| DE | 19646299 | 5/1998 |
| EP | 0828365 | 3/1998 |
| WO | 9624198 | 8/1996 |

OTHER PUBLICATIONS

Agere Claim Construction Brief—*Agere Systems v. Intersil Corporation*—Federal District Court (Delaware), Civil Action No. 02-1544-JJF.

(Continued)

*Primary Examiner* — Kevin C Harper

(57) ABSTRACT

A digital modulation system provides enhanced multipath performance by using modified orthogonal codes with reduced autocorrelation sidelobes while maintaining the cross-correlation properties of the modified codes. For example, the modified orthogonal codes can reduce the autocorrelation level so as not to exceed one-half the length of the modified orthogonal code. In certain embodiments, an M-ary orthogonal keying (MOK) system is used which modifies orthogonal Walsh codes using a complementary code to improve the auto-correlation properties of the Walsh codes, thereby enhancing the multipath performance of the MOK system while maintaining the orthogonality and low cross-correlation characteristics of the Walsh codes.

14 Claims, 6 Drawing Sheets

(56) References Cited

U.S. PATENT DOCUMENTS

| | | | |
|---|---|---|---|
| 5,218,619 | A | 6/1993 | Dent |
| 5,305,348 | A | 4/1994 | Izumi |
| 5,309,474 | A | 5/1994 | Gilhousen et al. |
| 5,325,394 | A | 6/1994 | Bruckert |
| 5,353,352 | A | 10/1994 | Dent et al. |
| 5,357,454 | A | 10/1994 | Dent |
| 5,533,013 | A | 7/1996 | Leppanen |
| 5,602,833 | A | 2/1997 | Zehavi |
| 5,751,761 | A | 5/1998 | Gilhousen |
| 5,809,060 | A | 9/1998 | Cafarella et al. |
| 5,862,182 | A | 1/1999 | Awater et al. |
| 5,909,462 | A | 6/1999 | Kamerman et al. |
| 6,028,728 | A | 2/2000 | Reed |
| 6,134,264 | A | 10/2000 | Shiba et al. |
| 6,154,504 | A | 11/2000 | Ino |
| 6,404,732 | B1 | 6/2002 | van Nee |
| 6,452,958 | B1 | 9/2002 | van Nee |
| 7,079,567 | B2 | 7/2006 | van Nee |
| 7,583,582 | B2 | 9/2009 | van Nee |
| 7,778,146 | B2 | 8/2010 | van Nee |
| 7,787,355 | B2 | 8/2010 | van Nee |
| 2009/0290481 | A1 | 11/2009 | van Nee |

OTHER PUBLICATIONS

Intersil Opening Brief on Claim Construction—*Agere Systems* v. *Intersil Corporation*—Federal District Court (Delaware), Civil Action No. 02-1544-JJF.

Plaintiff's Original Complaint for Patent Interference—*Agere Systems* v. *Sony Corporation, et al.*, U.S. District Court, Eastern District of Texas, Marshall Division, Case No. 2:06-CV-00079-TJW.

Plaintiffs First Amended Complaint for Patent Infringement—*Agere Systems* v. *Sony Corporation, et al.*, U.S. District Court, Eastern District of Texas, Marshall Division, Case No. 2:06-CV-00079-TJW.

Defendant Sony Computer Entertainment America Inc.'s Answer and Counterclaim to Plaintiff's First Amended Complaint for Patent Infringement—*Agere Systems* v. *Sony Corporation, et al.*, U.S. District Court, Eastern District of Texas, Marshall Division, Case No. 2:06-CV-00079-TJW.

Intersil Opening Brief for Claim Construction—*Agere Systems* v. *Intersil Corporation*—Federal District Court (Delaware), Civil Action No. 02-1544-JJF.

Plaintiffs Original Complaint for Patent Infringement—*Agere Systems* v. *Sony Corporation, et al.*, U.S. District Court, Eastern District of Texas, Marshall Division, Case No. 2:06-CV-00079-TJW.

Defendant Sony Computer Entertainment America Inc.'s Answer and Counterclaim to Plaintiffs First Amended Complaint for Patent Infringement—*Agere Systems* v. *Sony Corporation, et al.*, U.S. District Court, Eastern District of Texas, Marshall Division, Case No. 2:06-CV-00079-TJW.

R. Frank, "Polyphase Complementary Codes", 1980 IEEE, 0018-9448 /80/1100-0641, pp. 641-647.

T. Wilkinson, et al., "Minimisation of the Peak to Mean Envelope Power Ratio of Multicarrier Transmission Schemes by Block Coding", Proceedings of the Vehicular Technology Conference, US, New York, Jul. 1995, pp. 825-829.

van Nee, "OFDM Codes for Peak to Average Power Reduction and Error Correction", Global Telecommunications Conference (GLOBCOM), IEEE, US, New York, Nov. 1996, pp. 740-744.

van Nee, "Multipath Effects on GPS Code Phase Measurements", Navigation Journal of the Institute of Navigation, vol. 39, No. 2, Summer 1992, pp. 177-190.

Aldis, J.P., et al., "Physical Layer Architecture and Performance in the Wand User Trial System", ACTS Mobile Communications, Summer 1996, Granada, Spain, Nov. 27-29, 1996, pp. i-x, 196-203.

van Nee, et al., "Performance Degradation due to Code Tracking Errors in Spread Spectrum Code Division Multiple Access Systems", IEEE Journal on Selected Areas in Communications, vol. 14, No. 8, Oct. 1996, pp. 1669-1679.

van Nee, et al., "Magic in Reality, Building the Wand Modem", ACTS Mobile Communications, Summer 1997, Aalborg, Denmark, Oct. 7-10, 1997, pp. 533-538, 775-780.

van Nee, et al., "OFDM for Wireless Multimedia Communications", Chapter 10: "Applications of OFDM", pp. 229-241, Artech House, 2000.

Prasad, et al., "Data Transmission using Complementary Sequence Sets", 5th International Conference on HF Radio Systems and Techniques, Jul. 22-25, 1991, pp. 222-226.

Kretschmer, et al., "Doppler Properties of Polyphase Coded Pulse Compression Waveforms", IEEE Transactions on Aerospace and Electronic Systems, vol. AES-19, No. 4, Jul. 1983, pp. 521-531.

Popovic, "Syntheses of Power Efficient Multitone Signals with Flat Amplitude Spectrum", IEEE Transactions on Communications, vol. 39, No. 7, Jul. 1991, pp. 1031-1033.

Kachelmyer, et al., "M-ary Orthogonal Signaling in the Presence of Doppler", IEEE Transactions on Communications, vol. 41, No. 8, pp. 1192-1200, XP 000393461, Aug. 1993.

van Nee, et al., "Merged OFDM Physical Layer Specification for the 5 GHz Band", IEEE P802.11-98/72rl, Mar. 1998, pp. 1-27.

van Nee, et al., "IEEE P802.11 Wireless LANs—Sharing Performance Evaluation for TGA PHY Submission", IEEE P802.11-98/71rl, Mar. 1998, pp. 1-5.

van Nee, et al., "OFDM Physical Layer Specification for the 5 GHz Band", IEEE P802.11-98/12, Jan. 1998, pp. 1-12.

van Nee, et al., "Summary of Merged Proposal", IEEE P802.11-98/72a, Mar. 1998, pp. 1-5.

van Nee, "OFDM Performance Comparison Submission Template", IEEE P802.11-98/73, Feb. 1998, pp. 1-2.

Webster, "Multipath Issues and Architectures", IEEE P802.11-98/37, Jan. 1998, pp. 1-40.

Webster, et al., "Proposal for a High Speed PHY for the 2A GHz Band", IEEE P802.11-98/47, Jan. 1998, pp. 1-93.

Hortos, et al., "Empirical Benchmarks, High Rate PHY Example", IEEE P802.11-98/55, Jan. 1998, pp. 1-15.

Rood, "Implementation for a High Speed PHY for the 2.4 GHz Band", IEEE P802.11-98/56, Jan. 1998, pp. 1-9.

Kawaguchi, "FH Interoperability Addition to Harris HS PHY Proposal", IEEE P802.11-98/114a, Mar. 1998, pp. 1-17.

Webster, "DFE Packet Error Rate Minimization Using Precursor Sliding", IEEE P802.11-98/115, Mar. 1998, pp. 1-24.

Andren, "2A GHz High PHY" IEEE P802.11-98/116, Mar. 1998, pp. 1-39.

Webster, "Comparing Vector Modulations Using Similarity Transformations", IEEE P802.11-98/120, Mar. 1998, pp. 1-39.

Golay, "Complementary Series", IRE Transactions of Information, Apr. 1961, pp. 82-87.

Davis, et al., "Peak to Mean Power Control in OFDM, Golay Complementary Sequences and Reed-Muller Codes", IEEE Transactions on Information Theory, vol. 45, No. 7, Novemeber 1999, pp. 2397-2417.

Sivaswamy, "Multiphase Complementary Codes", IEEE Transactions on Information Theory, vol. IT-24, No. 5, Sep. 1978, pp. 546-552.

Bomer, et al., "Periodic Complementary Binary Sequences", IEEE Transactions on Information Theory, vol. 36, No. 6, Nov. 1990, pp. 1487-1494.

Gavish, et al., "On Ternary Complementary Sequences", IEEE Transactions on Information Theory, vol. 40, No. 2, Mar. 1994, pp. 522-526.

Spasojevic, et al., "Complementary Sequences for ISI Channel Estimation", IEEE Transactions on Information Theory, vol. 47, No. 3, Mar. 2001, pp. 1145-1152.

Chen, et al., "A Multicarrier CDMA Architecture Based on Orthogonal Complementary Codes for New Generations of Wideband Wireless Communications", IEEE Communications Magazine, Oct. 2001, pp. 126-135.

Tseng et al., "Asynchronous Multicarrier DS-CDMA using Mutually Orthogonal Complementary Sets of Sequences", IEEE Transactions on Communications, vol. 48, No. 1, Jan. 2000, pp. 53-59.

Tseng et al., "Complementary Sets of Sequences", IEEE Transactions on Information Theory, vol. IT-18, No. 5, Sep. 1972, pp. 644-652.

Rubin et al., "JTIDS 11/DTMA—Command and Control Terminals", pp. 1-7.

Cahn, "Spread Spectrum Applications and State of the Art Equipments", [Lecture], pp. 5-1-5-111.

Viterbi, "Very Low Rate Convolutional Codes for Maximum Theoretical Performance of Spread Spectrum Multiple Access Channels", IEEE Journal on Selected Areas in Communications, vol. 8, No. 4, May 1990, pp. 641-649.

Ling, et al., "Combined Orthogonal/Convolutional Coding for a Digital Cellular CDMA System", IEEE, 1992 pp. 63-66.

Holms, "Coherent Spread Spectrum Systems", John Wiley and Sons, 1982, pp. 1-624.

Blasbalg, "A Comparison of Pseudo Noise and Conventional Modulation for Multiple-Access Satellite Communications", IBM Journal, 1964, pp. 241-255.

Chang, et al. "Performance of a CDMA Radio Communications System with Feedback Power Control and Multipath Disperson", IEEE GLOBCOM, 1991 pp. 1017-1021.

Walton, et al., "Near Maximum Likelihood Demodulation for M-ary Orthogonal Signalling", IEEE GLOBCOM 1991, pp. 5-7.

Reference Data for Engineers: Radio, Electronics, Computer, and Communications, 7th Edition, Howard W. Sams & Co., 1985, pp. 24-1 to 24-26.

Lindsey et al., "Telecommunications Systems Engineering", Prentice-Hall, Inc., 1973, pp. 177-301.

Golomb, ed., "Digital Communications", Prentice-Hall, Inc., 1964, pp. 1-115.

* cited by examiner

M-ARY ORTHOGONAL KEYING SYSTEM

This is a continuation of application Ser. No. 12/508,785, filed Jul. 24, 2009, now issued as U.S. Pat. No. 7,957,256 which is a continuation of application Ser. No. 11/484,443, filed Jul. 10, 2006, now issued as U.S. Pat. No. 7,583,582, which is a continuation of application Ser. No. 10/153,412, filed May 22, 2002, now issued as U.S. Pat. No. 7,787,355, which is a continuation of application Ser. No. 09/057,310, filed Apr. 8, 1998, now issued as U.S. Pat. No. 6,404,732, which is a continuation in part of application Ser. No. 08/688,574, filed Jul. 30, 1996, now issued as U.S. Pat. No. 5,862,182, the teachings of all of which are incorporated herein in their entireties by reference.

BACKGROUND OF THE INVENTION

1. Field of the Invention

This invention relates to wireless communication systems and, more particularly, to a digital modulation system that uses modified orthogonal codes, such as M-ary orthogonal Keying (MOK) to encode information.

2. Description of Related Art

A wireless communications channel can rarely be modeled as purely line-of-site. Therefore, one must consider the many independent paths that are the result of scattering and reflection of a signal between the many objects that lie between and around the transmitting station and the receiving station. The scattering and reflection of the signal creates many different "copies" of the transmitted signal ("multipath signals") arriving at the receiving station with various amounts of delay, phase shift and attenuation. As a result, the received signal is made up of the sum of many signals, each traveling over a separate path. Since these path lengths are not equal, the information carried over the radio link will experience a spread in delay as it travels between the transmitting station and the receiving station. The amount of time dispersion between the earliest received copy of the transmitted signal and the latest arriving copy having a signal strength above a certain level is often referred to as delay spread. Delay spread can cause intersymbol interference (ISI). In addition to delay spread, the same multipath environment causes severe local variations in the received signal strength as the multipath signals are added constructively and destructively at the receiving antenna. A multipath component is the combination of multipath signals arriving at the receiver at nearly the same delay. These variations in the amplitude of the multipath components is generally referred to as Rayleigh fading, which can cause large blocks of information to be lost.

Digital modulation techniques can be used to improve the wireless communication link by providing greater noise immunity and robustness. In certain systems, the data to be transmitted over the wireless communication link can be represented or encoded as a time sequence of symbols, where each symbol has M finite states, and each symbol represents N bits of information. Digital modulation involves choosing a particular code symbol from the M finite code symbols based on the N bits of information applied to the modulator. For M-ary keying schemes, $\log_2 M$ bits of information can be represented or encoded by M different codes or code symbols which are transmitted. The transmitted codes are received as several delayed replicas of the transmitted codes, and the receiver correlates the delayed versions of the received codes with the known codes by performing a summation of autocorrelation values for all possible multipath delays.

The autocorrelation sidelobes show the correlation values between the known codes and the time shifted replicas of the received codes. If a code is the same or is a shifted version of itself, then the code will have a high level of autocorrelation or autocorrelation sidelobes. For example, for a code (111-1), the autocorrelation for a zero shift is:

| | |
|---|---|
| code | 1 1 1 -1 |
| shifted code | 1 1 1 -1 |
| multiplication | 1 1 1 1 |
| correlation = sum of multiplied values = 4. | |

For a shift of one chip, the autocorrelation is:

| | |
|---|---|
| code | 1 1 1 -1 |
| shifted code | 1 1 1 -1 |
| multiplication | 1 1 -1 |
| correlation = sum of multiplied values = 1. | |

For a shift of 2 chips, the autocorrelation is:

| | |
|---|---|
| code | 1 1 1 -1 |
| shifted code | 1 1 1 -1 |
| multiplication | 1 -1 |
| correlation = sum of multiplied values = 0. | |

For a shift of 3 chips, the autocorrelation is:

| | |
|---|---|
| code | 1 1 1 -1 |
| shifted code | 1 1 1 -1 |
| multiplication | -1 |
| correlation = sum of multiplied values = -1. | |

Larger shifts give an autocorrelation value of zero, so the maximum autocorrelation sidelobe in this example has a value or magnitude of 1. In this example, -1's are used in the receiver instead of 0's. The autocorrelation sidelobes give an indication about multipath performance. If the autocorrelation sidelobes are large, several multipath components heavily interfere with each other.

Cross-correlation refers to a code being correlated with different codes. M-ary orthogonal keying is a form of digital modulation which provides good cross-correlation between codes by encoding data using orthogonal codes which do not interfere with each other. FIG. 1 shows a general block diagram of an M-ary orthogonal keying system 10. In this example, input data is scrambled by a scrambler 12 as specified in the current Institute of Electrical and Electronics Engineers (IEEE) 802.11 standard. The data is then provided to a serial-to-parallel converter 14 which converts the serial data into 8 parallel bits forming a data symbol. A first modulator 16 receives three (3) of the parallel bits and produces a code of length 8 chips from a look-up table, and a second modulator 18 receives three (3) of the parallel bits and produces a second code of length 8 from a look-up table. Chips are actually code bits, but they are called chips to distinguish them from data bits. In this implementation, one of the parallel bits is provided to a first exclusive- or (XOR) gate 20 which inverts the code from the first modulator if the bit has a value of one. Similarly, the last remaining bit is provided to a second XOR gate 22 which inverts the code from the second modulator 18 if the bit has a value of one. In this embodiment, the output $I_{out}$ of the XOR gate 20 is applied to signal circuitry 21 to convert all 0's to −1's for transmission. The circuitry 21 can also manipulate, convert and/or process $I_{out}$ before being used to modulate a carrier with frequency ω by mixer 24. The output $Q_{out}$ from the XOR 22 is applied to signal circuitry 23 to convert all 0's into −1's for transmission. The circuitry 23 can manipulate, convert and/or process $Q_{out}$ before being used to modulate a 90 degrees shifted carrier by mixer 26. In this particular embodiment, the first modulator 16 corresponds to the in-phase (I) component of the output signal, and the second modulator 18 corresponds to the quadrature (Q) component of the output signal.

The modulators 16 and 18 are performing M-ary orthogonal keying or encoding because each receive $\log_2 M$ bits of information and chooses one out of M orthogonal codes. By having both I and Q components with different polarities, a total of $(2M)^2$ possible code combinations exist, so a total of $2+2 \log_2 M$ bits can be encoded into one orthogonal code. In this example, M is equal to 8. The M codes in an M-ary orthogonal keying system are usually based on M chip Walsh codes. Using the M chip Walsh codes in an M-ary orthogonal keying system is advantageous because the M chip Walsh codes are orthogonal, which means they exhibit zero cross-correlation, so the M chip Walsh codes tend to be easily distinguishable from each other. However, using Walsh codes as the orthogonal codes can create potential problems. For example, when Walsh code 0 (all 1's) is selected as the code symbol, Walsh code 0 may appear as an unmodulated continuous wave (CW) carrier signal.

To avoid the Walsh code 0 CW modulation, M-ary orthogonal keying systems have been proposed which use a cover sequence of (11111100) to modify the Walsh codes by inverting the last two bits of each Walsh code. Although the Walsh code 0 CW modulation is resolved by modifying the Walsh codes in this fashion, the modified Walsh codes retain the poor autocorrelation and spectral properties which are inherent to Walsh codes. To counter the poor autocorrelation and spectral properties of the Walsh codes, current systems multiply the output signal by a pseudo-random noise (PN) sequence. Some systems multiply by a PN sequence having a length much larger than the Walsh code as described in E. G. Tiedemann, A. B. Salmasi and K. S. Gilhousen, "The Design And Development of a Code Division Multiple Access (CDMA) System for Cellular and Personal Communications," Proceedings of IEEE PIMRC, London, Sep. 23-25, 1991, pp. 131-136. Other systems multiply the Walsh codes by a PN sequence with the same length as the Walsh code. However, the autocorrelation properties of the resulting codes are still lacking. If the transmitted codes lack sufficient autocorrelation properties, the multipath performance of the system can be poor because the system will have difficulty detecting the delayed or shifted versions of the transmitted codes.

SUMMARY OF THE INVENTION

The present invention involves a digital (de)modulation system which provides enhanced multipath performance by using modified orthogonal codes with reduced autocorrelation sidelobes while maintaining the cross-correlation properties of the modified codes. The modified orthogonal codes have autocorrelation sidelobes that do not exceed one-half the length of the modified orthogonal code. In certain embodiments, an M-ary orthogonal keying (MOK) system is used which modifies orthogonal Walsh codes using a complementary code to improve the auto-correlation properties of the Walsh codes, thereby enhancing the multipath performance of the MOK system while maintaining the orthogonality and low cross-correlation characteristics of the Walsh codes.

BRIEF DESCRIPTION OF THE DRAWINGS

Other aspects and advantages of the present invention may become apparent upon reading the following detailed description and upon reference to the drawings in which.

DETAILED DESCRIPTION

Figure 2:
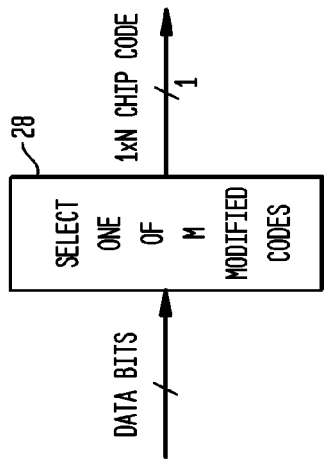
FIG. 2 shows a block diagram of a digital modulation system using modified orthogonal codes to reduce the autocorrelation sidelobes of the orthogonal codes.

Illustrative embodiments of the digital (de)modulation system to enhance multipath performance for a wireless communications system is described below. FIG. 2 shows a digital modulator 28 according to the principles of the present invention. In response to data bits, the modulator 28 chooses a corresponding one of M codes. The M codes are produced by modifying a set of orthogonal codes to reduce the autocorrelation levels associated with those orthogonal codes while maintaining the orthogonality of the set. For example, if the same chip(s) in the codes of the orthogonal code set is inverted, the modified orthogonal codes remain orthogonal. In accordance with aspects of the present invention, an orthogonal code set is modified with another code to produce M orthogonal N-chip codes having autocorrelation sidelobes which do not exceed N/2 in value. The modulator 28 can perform the modification of the orthogonal codes using some processing circuitry implementing some logic to perform the modification, or the modulator 28 can store the modified orthogonal codes in a look-up table. The modulator 28 can also store different sets of modified orthogonal codes depending on desired changes in operation or calculate different sets of the modified orthogonal codes. The modification of the orthogonal codes can be performed by an element by element multiplication of the orthogonal codes with a code having good autocorrelation properties. Thus, the modulator 28 produces codes with low autocorrelation properties while maintaining at least some of the orthogonality characteristics of the original orthogonal codes. In this embodiment, the data bits are shown as being received in parallel, and the code chips are shown as being produced serially. Depending on the application, the data bits can be received serially, and/or the code chips can be produced in parallel.

Complementary codes or sequences are sets of sequences characterized by the property that for shifts in the sequences the autocorrelations of the sequences sum to zero except for the main peak at zero shift. As such, complementary codes can be used to modify the set(s) of orthogonal codes of the modulator 28. Complementary codes are discussed in Robert L. Frank, "Polyphase Complementary Codes." IEEE Transactions On Information Theory, Vol. IT-26, No. 6, November 1980, pp. 641-647. For lengths equal to a power of two, complementary codes are easily generated by the following rule; starting with sequences A=B={1}, a complementary code of twice the length is given by ABAB', where B' means inverting all elements of sequence B. Hence, for lengths 2 up to 16, complementary sequences are:
{1 0}
{1 1 1 0}
{1 1 1 0 1 1 0 1}
{1 1 1 0 1 1 0 1 1 1 1 0 0 0 1 0}
Additionally, other transformations can be done on a complementary code to generate other complementary codes from the same length. For instance, it is possible to reverse the first or second half of the code, so {1 1 1 0 1 0 1 1} would be another complementary code of length 8.

Complementary codes have low auto-correlation sidelobes, and a complementary code multiplied by a Walsh function produces another complementary code. As such, if a complementary code is used to modify a Walsh code set, the resulting modified Walsh codes are complementary and have the same low auto-correlation sidelobes. The modified Walsh code set also remains orthogonal, which means that the cross correlation between any two different codes is zero (for a zero delay).

Figure 3:
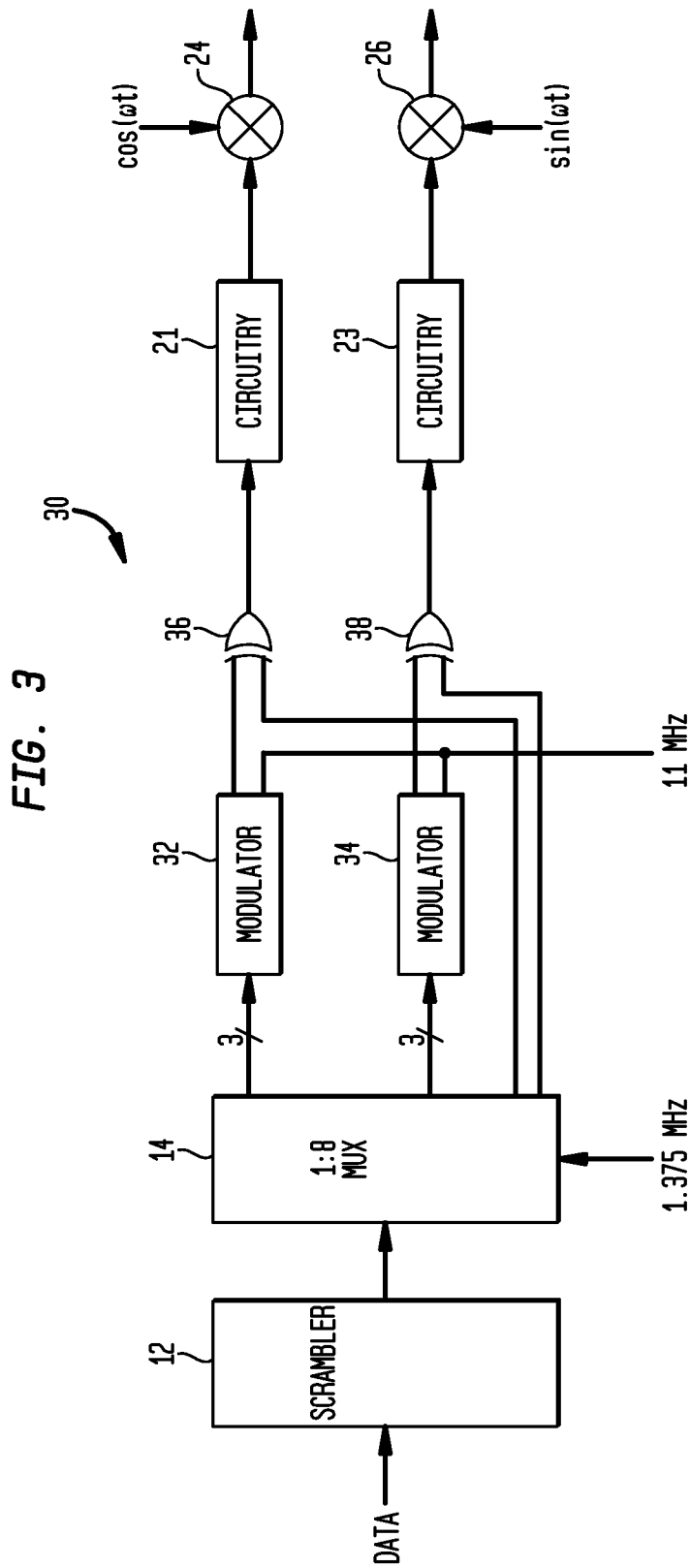
FIG. 3 shows a block diagram of an embodiment of a MOK system according to the principles of the present invention.

FIG. 3 shows an embodiment of a MOK system 30 using modulators 32 and 34 to produce length 8 codes in response to 3 information bits from the serial to parallel converter 14. In this embodiment, the set of orthogonal codes is the length 8 Walsh code set, and the Walsh code set is modified using a complementary code. The length 8 Walsh code set is:

| 1 | 1 | 1 | 1 | 1 | 1 | 1 | 1 |
| 1 | 1 | 1 | 1 | 0 | 0 | 0 | 0 |
| 1 | 1 | 0 | 0 | 1 | 1 | 0 | 0 |
| 1 | 0 | 0 | 1 | 1 | 0 | 0 | 1 |
| 1 | 0 | 1 | 0 | 1 | 0 | 1 | 0 |
| 1 | 0 | 1 | 0 | 0 | 1 | 0 | 1 |
| 1 | 0 | 0 | 1 | 0 | 1 | 1 | 0 |
| 1 | 1 | 0 | 0 | 0 | 0 | 1 | 1 |

In previous systems, the Walsh codes are modified by an element by element exclusive-or with the code {1 1 1 1 1 1 0 0}, so the last two chips of each Walsh code (or the chips of the last two columns of the Walsh code set) are inverted. This modifying code, however, has auto-correlation sidelobes with a worst-case magnitude of 5 (using –1's for the 0's), which is an autocorrelation value greater than one-half the length of the 8 chip code and produces multipath performance problems.

Instead, in the embodiment of FIG. 3, the MOK system 30 uses (a) length 8 complementary code(s), for example the sequences {1 1 1 0 1 1 0 1} or {1 1 1 0 1 0 1 1}, to modify the length 8 Walsh code set. For the latter code, the modified Walsh code set appears as:

| 1 | 1 | 1 | 0 | 1 | 0 | 1 | 1 |
| 1 | 1 | 1 | 0 | 0 | 1 | 0 | 0 |
| 1 | 1 | 0 | 1 | 1 | 0 | 0 | 0 |
| 1 | 0 | 0 | 0 | 1 | 1 | 0 | 1 |
| 1 | 0 | 1 | 1 | 1 | 1 | 1 | 0 |
| 1 | 0 | 1 | 1 | 0 | 0 | 0 | 1 |
| 1 | 0 | 0 | 0 | 0 | 0 | 1 | 0 |
| 1 | 1 | 0 | 1 | 0 | 1 | 1 | 1 |

This modified Walsh code set produces worst-case autocorrelation sidelobes having a magnitude or value of only 2. As such, this modified code compares favorably in performance to complementary Barker codes which have autocorrelation sidelobes bounded to only one. Complementary Barker codes are discussed in Robert L. Frank, "Polyphase Complementary Codes." IEEE Transactions On Information Theory, Vol. IT-26, No. 6, November 1980, pp. 641-647. However, Barker codes or sequences only exist for certain odd lengths such as length 11. The first of the two complementary codes specifically mentioned above has improved cross-correlation properties for time shifted codes.

In the operation of the embodiment of FIG. 3, the scrambler 12 receives data and scrambles the data according to the IEEE 802.11 standard. In other embodiments, the scrambler 12 may not be necessary, and the data can be manipulated by some other form of data conversion, interleaving or modification, or the data can be fed directly into the serial-to-parallel converter 14. In this embodiment, the serial-to-parallel converter 14 is a 1:8 multiplexer (MUX) which produces a data symbol of 8 data bits in parallel according to a 1.375 MHz clock signal. The eight bit data symbol is encoded into a symbol comprising a I/Q code pair of 8 chip codes or codewords, so the symbol interval is equal to the code length. Three (3) of the bits of the data symbol are provided to the first modulator 32 which produces a corresponding length 8 Walsh code which has been modified by a complementary code. The first modulator 32 produces the length 8 Walsh code at a chip rate of about 11 MHz as dictated by an 11 MHz clock signal. In the above example, each symbol contains 8 data bits, which are encoded into independent I and Q codes of 8 chips. Chips are actually code bits, but they are called chips to distinguish them from data bits. In this embodiment, the first modulator 32 corresponds to the I phase modulation branch of the MOK system 30 which produces the I component of the of the signal to be transmitted.

A second set of three (3) bits of the data symbol from the converter 14 is provided to the second modulator 34 which produces a corresponding length 8 Walsh code which has been modified using a complementary code. The second modulator 34 corresponds to the Q phase modulation branch of the MOK system 30 which produces the Q component of the of the signal to be transmitted. In response to the three data bits, the second modulator 34 also produces a length 8 Walsh code at a chip rate of about 11 MHz as dictated by the 11 MHz clock signal.

Of the remaining two of eight bits of the data symbol from the serial to parallel converter 14, one is provided to a first XOR gate 36. If the bit is a 0, the first XOR gate 36 changes the polarity of the length 8 Walsh code from the first modulator 32. The resulting modified Walsh code $I_{out}$ is provided to signal circuitry 21 to change any 0's to 1's and perform any additional signal processing and/or conversion before being provided to the first mixer 24 to modulate a carrier of frequency ω. The last remaining bit is provided to a second XOR gate 38. If the bit is a 0, the second XOR gate 38 changes the polarity of the length 8 Walsh code from the second modulator 34. The resulting modified Walsh code $Q_{out}$ is provided to the signal circuitry 23 for any conversion and/or processing before being provided to the second mixer 26 to modulate a 90 degree shifted version of the carrier with frequency ω. If instead of 0's, −1's are used, the first and second XOR gates 36 and 38, can be replaced by multipliers to change the polarity of $I_{out}$ and $Q_{out}$. Subsequently, the $I_{out}$ modulated carrier and the $Q_{out}$ modulated carrier are combined and transmitted. As such, this particular embodiment of the MOK system 30 partitions 8 bits of incoming data into 4 bits for the I branch and 4 bits for the Q branch. The three data bits on the I branch are encoded into a code of 8 chips, and the three data bits on the Q branch are encoded in parallel into a code of 8 chips. Because the last two bits encode information by determining the polarity of the 8 bit symbols respectively, the MOK system 30 encodes 8 data bits into 2 codes which are both picked from a set of 16 possible codes. In this example, there are 8 modified Walsh codes, which can be inverted to get 16 codes. With a symbol rate of 1.375 MSps and 8 bits/symbol, the data rate for the MOK system 30 is 11 MBps.

Figure 4:
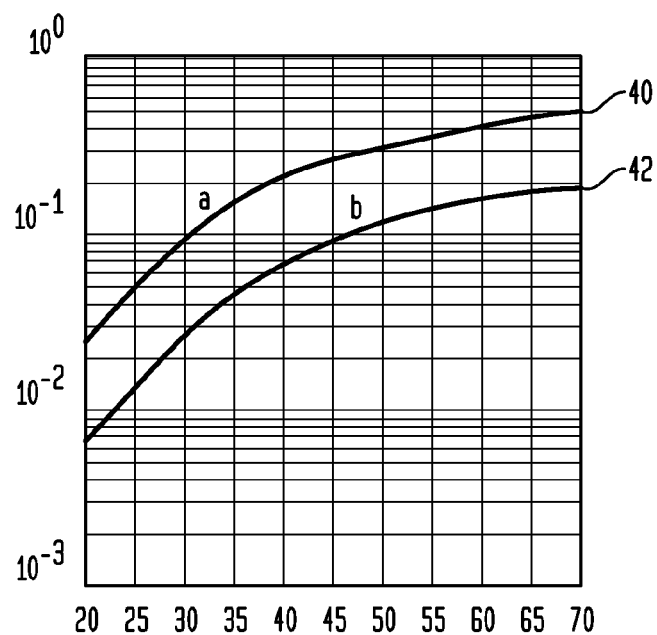
FIG. 4 shows a graphical comparison of packet error ratio versus delay spread for a MOK system using Walsh codes modified by a cover sequence in current systems v. modified Walsh codes to reduce the autocorrelation sidelobes.

FIG. 4 shows a graphical comparison of the packet error ratio v. delay spread (ns) in multipath fading channels using 8 bits per symbol at 11 Mbps and a 4 taps channel matched filter as would be understood by one of ordinary skill in the art, Curve 40 corresponds to digital modulation using Walsh codes modified by the cover sequence (11111100) of systems of the current art, and curve 42 corresponds to digital modulation using Walsh codes modified by a complementary code (11101011) according to the principles of the present invention. The channel model used has an exponentially decaying power delay profile and independent Rayleigh fading paths. FIG. 4 shows that by using the complementary code, the system can tolerate a delay spread that is about 50% larger (curve 42) than for the other code (curve 40) to achieve a packet error ratio of 1% or 10%.

Figure 5:
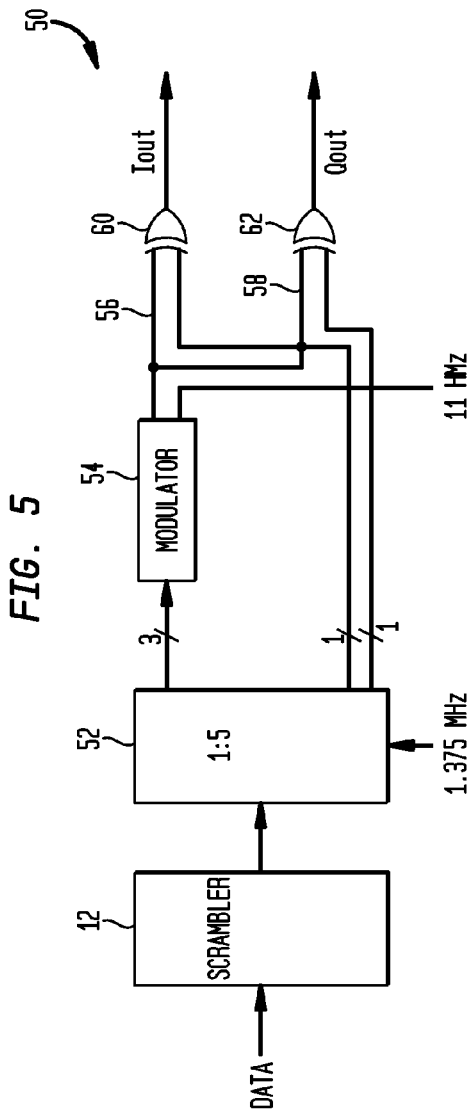
FIG. 5 shows a block diagram of another embodiment of the MOK system according to the principles of the present invention.

FIG. 5 shows an embodiment of a MOK system 50 which can be used as a fallback mode for the MOK system 30 (FIG. 3). Once again, the input data is scrambled by the scrambler 12 according to the IEEE 802.11 standard. The data is provided to a serial to parallel converter 52. The serial to parallel converter 52 in this embodiment produces 5 bit data symbols in parallel at a data symbol rate of 1.375 MSps. From the 5 bit data symbol, three bits are received by a modulator 54 which encodes the 3 bits into a length 8 modified Walsh code according to the principles of the present invention. The length 8 modified Walsh code is provided to both I and Q branches 56 and 58. In accordance with another inventive aspect of this particular embodiment, by providing the same code to multiple phase modulation paths or branches, this embodiment allows a fallback mode with independent phase modulation, such as quadrature phase shift keying (QPSK) or 8-phase shift keying (8-PSK), of the same code on the multiple phase modulation paths, such as the I and Q branches 56 and 58 in this embodiment. On the I branch 56, the 8 chip modified Walsh code is serially provided to a first XOR gate 60, and on the Q branch 58, the 8 chip Walsh code is serially provided to a second XOR gate 62. Of the two remaining bits from the serial to parallel converter 52, one bit goes to the first XOR gate 60 to adjust the polarity of the length 8 modified Walsh code and produce $I_{out}$ on the I branch 56, and the other bit goes to the second XOR gate 62 to adjust the polarity of the length 8 modified Walsh code and produce $Q_{out}$ on the Q branch 58. Depending on the implementation, if −1's are used instead of 0's, the first and second XOR gates 60 and 62 can be replaced by multipliers. As such, given data symbols of 5 bits/symbol and a symbol rate of 1.375 MBps, this embodiment provides a data rate of 6.8 MBps.

Figure 6:
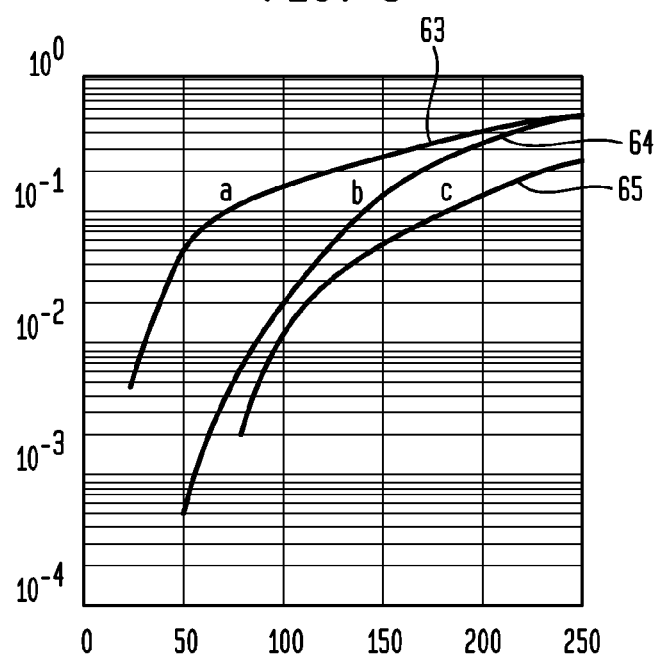
FIG. 6 shows a graphical comparison of packet error ratio versus delay spread for embodiments of the MOK system using Walsh codes modified by a cover sequence in current systems v. modified Walsh codes to reduce the autocorrelation sidelobes.

FIG. 6 shows a graphical comparison of the packet error ratio v. delay spread (ns) in multipath fading channels using 1) Walsh codes modified by the cover sequence (11111100) of current systems with quadrature phase shift keying (QPSK) at a fallback rate of 6.8 Mbps (curve 63), 2) Walsh codes modified by a complementary code (for example, 11101011) using 8-phase shift keying (8-PSK) at 8.25 Mbps (curve 64), and 3) Walsh codes modified by a complementary code (for example, 11101011) using QPSK at a fallback rate of 6.8 Mbps and the same code on I and Q branches (curve 65). The channel model used has an exponentially decaying power delay profile and independent Rayleigh fading paths. FIG. 6 shows that the delay spread tolerance is more than doubled by using the codes proposed by the invention. Additionally, FIG. 6 shows that the digital modulation system can be used with alternative modulation schemes, such as 8-PSK instead of QPSK, to get a higher data rate (8.25 Mbps) without losing much delay spread performance as would be understood by one of skill in the alt.

Figure 7:
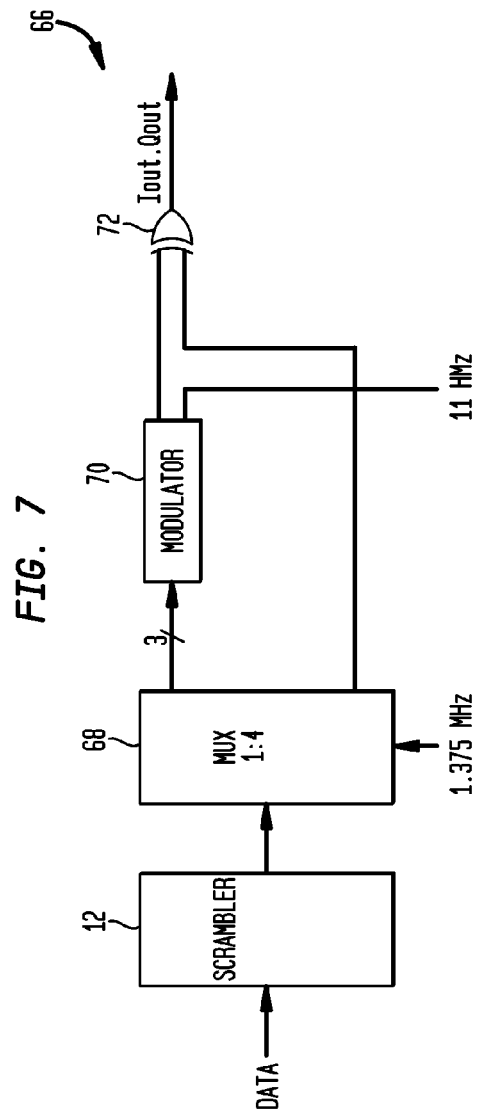
FIG. 7 shows a block diagram of another embodiment of the MOK system according to certain principles of the present invention.

FIG. 7 shows an embodiment of a MOK system 66 which can be used as a fallback mode for the MOK system 30 (FIG. 3). The input data is scrambled by the scrambler 12 according to the IEEE 802.11 standard. The scrambled data is provided to a serial to parallel converter 68. The serial to parallel converter 68 in this embodiment produces 4 bit data symbols in parallel at a symbol rate of 1.375 MSps. From the 4 bit data symbol, three bits are received by a modulator 70 which encodes the 3 bits into a length 8 modified Walsh code according to the principles of the present invention. The modulator 70 serially produces the length 8 Walsh code at a rate of 11 MHz. The length 8 modified Walsh code is provided to an XOR gate 72 corresponding to both the I and Q branches. The length 8 modified Walsh code is multiplied by the remaining bit of the data symbol from the serial-to-parallel converter 68 to adjust the polarity of the length 8 code and produce $I_{out}$ and $Q_{out}$ in serial form. Depending on the implementation, if −1's are used instead of 0's, the XOR gate 72 can be replaced by a multiplier. As such, given data symbols of 4 bits/symbol and a symbol rate of 1.375 MBps, this embodiment provides a data rate of 5.5 MBps.

Figure 8:
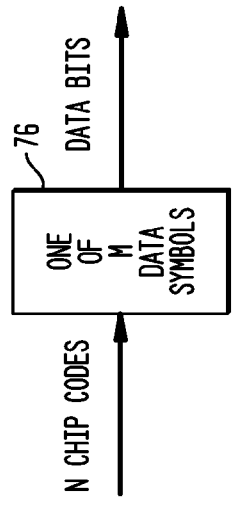
FIG. 8 shows a digital demodulator according to certain principles of the present invention.

FIG. 8 shows a digital demodulation system 76 which can be used at a receiver (not shown) to receive transmitted codes from a transmitter (not shown) using an embodiment of the digital modulation system described above. The digital demodulation system 76 receives a modified orthogonal code according to the principles of the present invention. In response to the modified orthogonal code, the digital demodulation system produces a corresponding data symbol. Depending on the particular implementation, the code chips and/or the data bits can be in parallel or in series.

Figure 9:
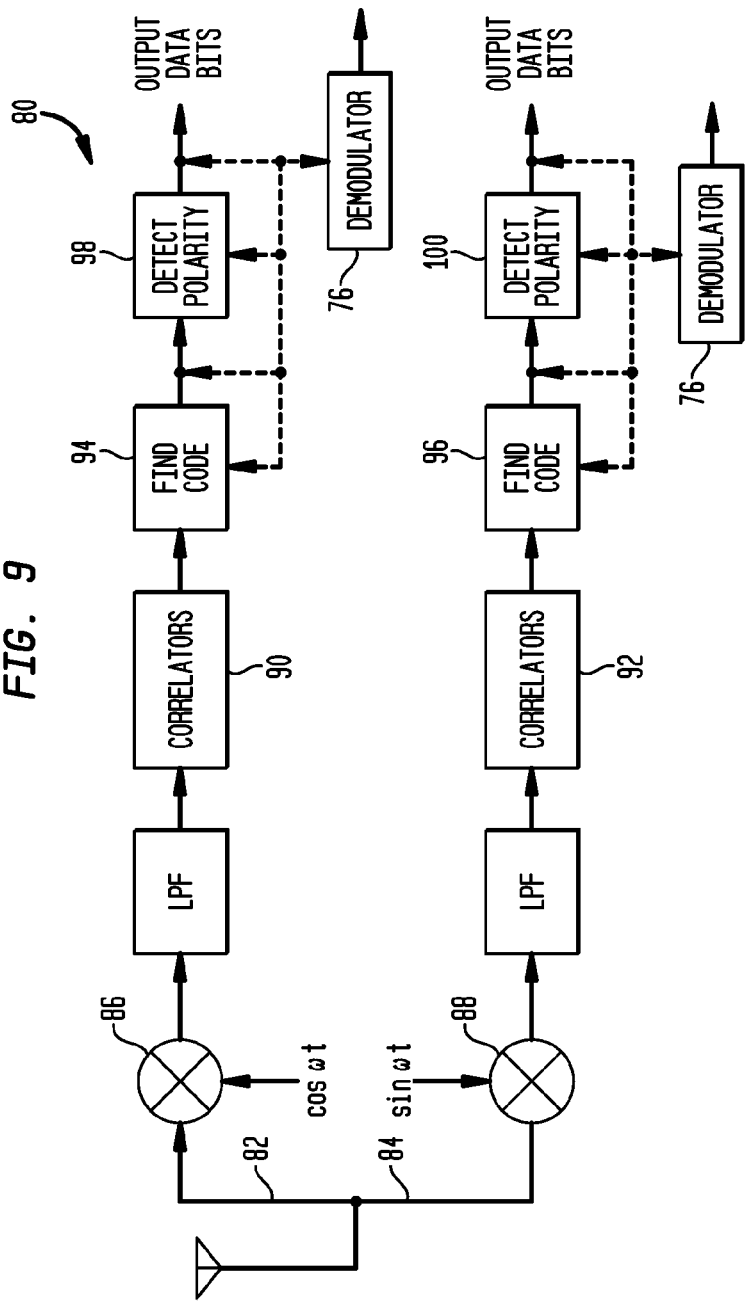
FIG. 9 shows a demodulation system using the digital demodulator according to certain principles of the present invention.

FIG. 9 shows a demodulation system 80 using the digital demodulation system according to the principles of the present invention. In this particular embodiment, the received signal is supplied to both I and Q branches 82 and 84 of the demodulation system 80. A first mixer 86 multiplies the received signal by the cos ωt, where ω is the carrier frequency, to extract the modulated I information, and a second mixer 88 multiplies the received signal by sin ωt to extract the modulated Q information. After low pass filtering, the I and Q information are provided to correlator blocks 90 and 92, respectively. In this particular embodiment, the correlator blocks 90 and 92 contain 8 correlators for correlating time delayed versions of the I information and the Q information, respectively. The find code blocks 94 and 96 find the known modified orthogonal codes according to the present invention which give the highest correlation magnitudes for the I and Q information. In certain embodiments, the demodulator 76 (FIG. 8) or portions thereof can be performed in or receive the output from the find code blocks 94 and 96 to decode the known orthogonal codes into corresponding data bits. Depending on the embodiment, the digital demodulation system 76 (FIG. 8) or portions thereof can be implemented in the find code blocks 94 and 96, in the detect polarity blocks 98 and 100, branching off of the of the I and Q paths 82 and 84 and/or at the output of detect polarity blocks 98 and 100 to decode the modified orthogonal codes to produce the corresponding data bits. In this embodiment, the detect polarity blocks 98 and 100 each decodes an additional data bit each from the polarity of the found modified orthogonal code.

Figure 10:
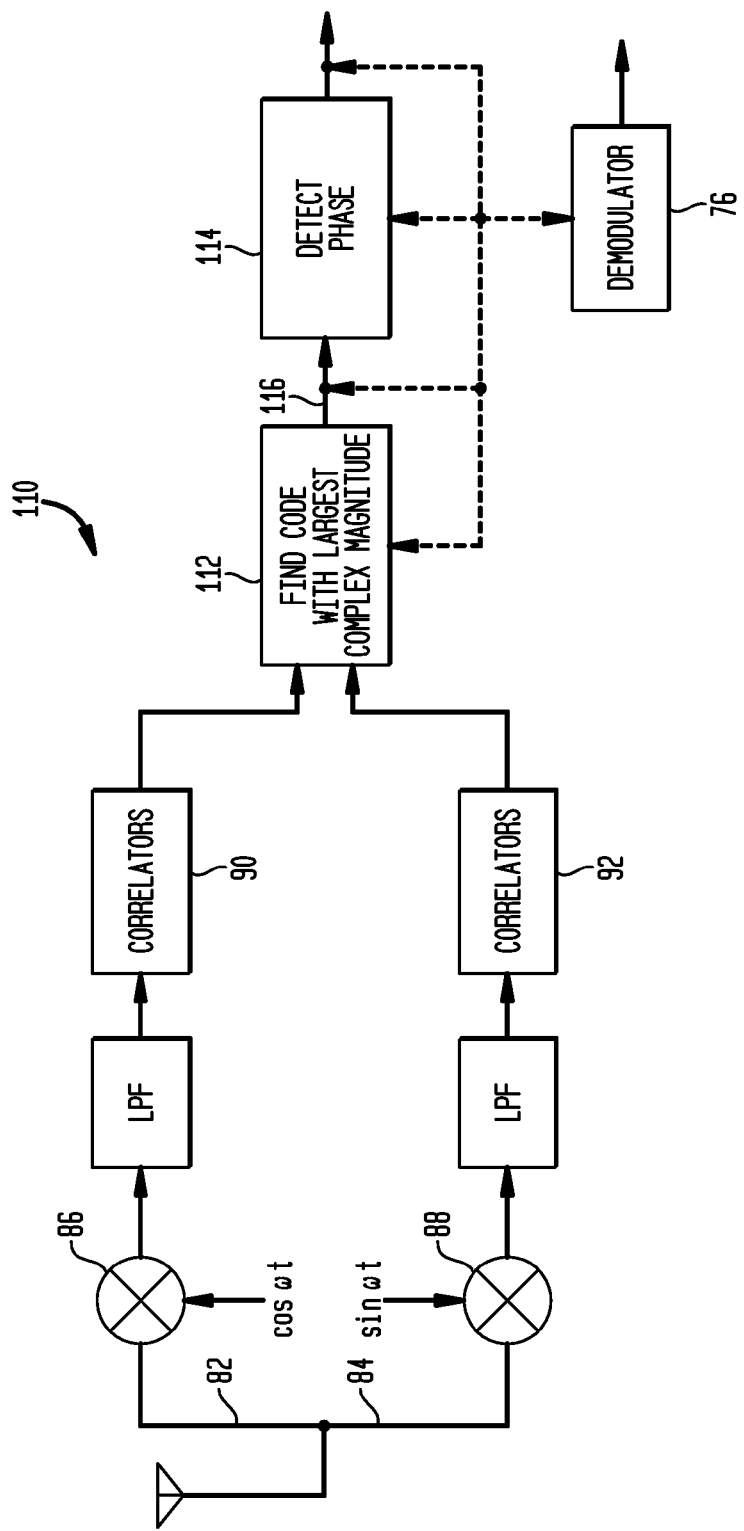
FIG. 10 shows another embodiment of a demodulation system using the digital demodulator according to the principles of the present invention.

FIG. 10 shows an embodiment of a demodulation system 110 which can be used at the fallback rate for the demodulator system 80 (FIG. 9) receiving code symbols from the modulator system 50 (FIG. 5) where the same code is transmitted on multiple modulation paths. The difference between the demodulation system 110 and the full rate demodulation system of FIG. 9 is that the code detection block 112 adds the squared correlation outputs of the I and Q correlators 90 and 92 and detects the modified orthogonal code according to the present invention which gave the highest correlation complex magnitude. In accordance with an inventive aspect of this particular embodiment, the same code is on both the I and Q paths 82 and 84 for digital demodulation. In this particular embodiment, a block 114 finds the modified orthogonal code with the highest complex correlation magnitude. In certain embodiments, the demodulator 76 or portions thereof can be performed in or receive the output from the find code block 112 to decode the modified orthogonal codes into corresponding data bits. Depending on the embodiment, the digital demodulation system 76 (FIG. 8) or portions thereof can be implemented in the code detection block 112, in a phase detector 114, branching off of the path 116 and/or at the output of the phase detector 114 to decode the modified orthogonal codes and produce the corresponding data bits. The phase detector 114 detects the phase of the complex correlation output to decode an extra 2 bits per code symbol for QPSK or an extra 3 bits per code symbol for 8-PSK.

Figure 1:
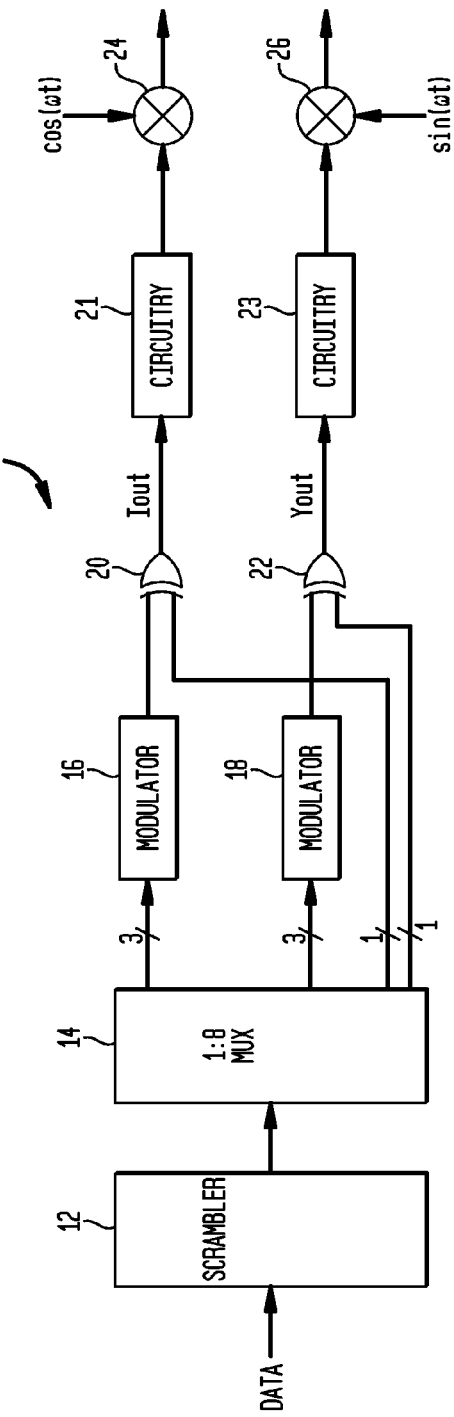
FIG. 1 shows a block diagram of a M-ary orthogonal keying (MOK) system using Walsh codes modified by a cover sequence (11111100)

In addition to the embodiment described above, alternative configurations of the digital (de)modulation system according to the principles of the present invention are possible which omit and/or add components and/or use variations or portions of the described system. For example, the above applications use a Quadrature Phase Shift Keying (QPSK) phase shift modulation scheme (FIG. 1, 3, 5) along with the digital modulation scheme and a binary phase shift keying (BPSK) scheme (FIG. 6), but the digital modulation system can be used with other modulation schemes, such as amplitude modulation including quadrature amplitude modulation (QAM) and other phase modulation schemes including 8-phase shift keying (8-PSK) as would be understood by one of ordinary skill in the art. Additionally, The digital modulation system has been described as using orthogonal codes of 1's and 0's which are modified by codes of 1's and 0's, but the digital modulation system can be performed using codes of 1's and −1's or 1's and 0's depending on the embodiment. In the embodiments described above, codes of 1's and −1's are received at the receiver, and the correlation determinations are described in terms of 1's and −1's, but the demodulation system can use 1's and 0's or 1's and −1's depending on the embodiment.

Furthermore, the digital modulation system has been described using a particular configuration of distinct components, but the digital modulation system can be performed in different configurations and in conjunction with other processes. Additionally, the various components making up the digital modulation system and their respective operating parameters and characteristics should be properly matched up with the operating environment to provide proper operation. It should also be understood that the digital modulation system and portions thereof can be implemented in application specific integrated circuits, software-driven processing circuitry, firmware, lookup-tables or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

The invention claimed is:

1. An M-ary orthogonal keying (MOK) modulator comprising:
    a serial-to-parallel converter configured to generate data symbols based on received input data bits;
    a first modulator configured to (i) receive a first n bits of each data symbol and (ii) select a corresponding length q orthogonal code modified by a complementary code based on the n bits;
    a second modulator configured to (i) receive a subsequent m bits of each data symbol and (ii) select a corresponding length r orthogonal code modified by the complementary code based on the m bits;
    a first logic device configured to, if a first subsequent bit of the data symbol is a first predefined value, change polarity of the modified length q orthogonal code generated by the first modulator;
    a second logic device configured to, if a second subsequent bit of the data symbol is a second predefined value, change polarity of the modified length r orthogonal code generated by the second modulator;
    a first mixer configured to modulate the modified length q orthogonal code with a carrier frequency;
    a second mixer configured to modulate the modified length r orthogonal code with the carrier frequency shifted by 90 degrees;
    wherein the modulated modified length q orthogonal code and the modulated modified length r orthogonal code are combined and transmitted.

2. The modulator of claim 1, wherein the first modulator is configured to generate an In-Phase (I) component of the transmit signal and wherein the second modulator is configured to generate a Quadrature (Q) component of the transmit signal.

3. The modulator of claim 1, wherein the first modulator and the second modulator are further configured to select the corresponding orthogonal code modified by a complementary code from one of M modified orthogonal codes.

4. The modulator of claim 3, wherein the M modified orthogonal codes are stored in a lookup table.

5. The modulator of claim 3, wherein the chosen one of the M modified orthogonal codes is defined according to the expression:

$$c = \{e^{j(\Phi_1+\Phi_2+\Phi_3+\Phi_4)}, e^{j(\Phi_1+\Phi_3+\Phi_4)}, e^{j(\Phi_1+\Phi_2+\Phi_4)}, -e^{j(\Phi_1+\Phi_4)}, e^{j(\Phi_1+\Phi_2+\Phi_3)}, e^{j(\Phi_1+\Phi_3)}, -e^{j(\Phi_1+\Phi_2)}, e^{j\Phi_1}\},$$

where Φi correspond to phase angles of code bits associated with the ith group of code bits.

6. The modulator of claim 3 wherein each of the M modified codes has N chips, and wherein M>N.

7. The modulator of claim 1, comprising a scrambler in communication with the serial-to-parallel converter, the scrambler configured to receive the input data bits, generate scrambled input data bits and provide the scrambled input data bits to the serial-to-parallel converter.

8. The modulator of claim 1, wherein the serial-to-parallel converter is a 1:8 multiplexer configured to generate an eight bit data symbol.

9. The modulator of claim 8, wherein the serial-to-parallel converter operates at a clock rate of 1.375 MHz, and wherein the first modulator and the second modulator operate at a clock rate of 11 MHz.

10. The modulator of claim 1, wherein n and m are equal to 3 bits and wherein q and r are equal to 8 bits.

11. The modulator of claim 1 wherein each orthogonal code is a Walsh code.

12. The modulator of claim 1, wherein the phase of the carrier signal is QPSK modulated in accordance with the selected of the M modified orthogonal codes.

13. The modulator of claim 1, wherein the complementary code has a length of $2^x$ chips where X is a positive integer.

14. The modulator of claim 1, wherein the complementary code is defined by the sequence ABAB', such that A is a sequence of elements and B is a sequence of elements and wherein B' is derived by inverting all elements in the sequence B, and wherein A={11} and B={10} such that the sequence ABAB'={11101101}.

\* \* \* \* \*